United States Patent [19]
Wright et al.

[11] Patent Number: 5,199,509
[45] Date of Patent: Apr. 6, 1993

[54] CONTROLLED GAS TRAP SYSTEM

[75] Inventors: Alan C. Wright, Bellaire; Scott A. Hanson; Patrick L. DeLaune, both of Houston; Howard L. McKinzie; Hossein Aghazeynali, both of Sugar Land, all of Tex.

[73] Assignee: Texaco Inc., White Plains, N.Y.

[21] Appl. No.: 835,874

[22] Filed: Feb. 14, 1992

[51] Int. Cl.⁵ .................... E21B 44/00; E21B 49/00
[52] U.S. Cl. ............................. 175/50; 175/206; 175/207; 73/153; 55/203
[58] Field of Search .................. 175/50, 206, 207, 209, 175/213; 73/153; 55/203

[56] References Cited

U.S. PATENT DOCUMENTS

| | | | |
|---|---|---|---|
| 4,319,482 | 3/1982 | Bunner | 73/153 |
| 4,326,863 | 4/1982 | Day et al. | 55/203 |
| 4,358,298 | 11/1982 | Ratcliff | 55/203 |
| 4,536,286 | 8/1985 | Nugent | 175/206 X |

FOREIGN PATENT DOCUMENTS

2006766 10/1990 Canada .

OTHER PUBLICATIONS

Evaluation of Gas-Extraction Efficiency During Mud Logging Operations S. S. Elder, SPE/IADC 16158.
Improved Methods for Sampling Gas and Drill Cuttings R. D. Williams, et al., SPE 16759.
New System Provides Continuous Quantitative Analysis of Gas Concentration in the Mud While Drilling; V. C. Kelessidis, et al., SPE 19562.
New Gas Logging System Improves Gas Shows Analysis and Interpretation L. L. de Pazzis, SPE 19605.
A New Surface Gas Detector for Drilling Fluids H. K. Johnson et al., OTC 5793.

*Primary Examiner*—Terry Lee Melius
*Attorney, Agent, or Firm*—James L. Bailey; Jack H. Park; Russell J. Egan

[57] ABSTRACT

An improved gas trap for mud logging is vertically mounted such that its lower end is constantly beneath the surface of mud flowing in a tank. The mud is drawn into the housing where it is agitated to release the entrained gases which are drawn off for measurement. The spent mud is returned to the tank through a mud exit port and related pipe to a point below the level of the mud and remote from the mud intake to the gas trap. This gas trap is insensitive to mud level changes and is relatively free of maintenance requirements.

7 Claims, 2 Drawing Sheets

CONTROLLED GAS TRAP SYSTEM

BACKGROUND OF THE INVENTION

1. The Field of Invention

The present invention relates to a method and apparatus for uniformly and continuously drawing samples of gas entrained in a liquid containing a high percentage of solids. More particularly, the present invention relates to a method and apparatus for obtaining samples of gases contained in drilling mud coming to the surface from an oil well drilling operation.

2. The Prior Art

The conventional practice in drilling for oil is to use a special fluid, termed "drilling mud", which is pumped down the drill string to circulate from the drilling head and carry upward to the surface the debris created by the drilling operation. When a gas-containing strata is encountered by the drilling operation, a certain amount of the gas from the strata will be entrained in the drilling mud and thus be carried to the surface. Extracting these gases from the drilling mud allows determination of the presence of hydrocarbons and an estimate of the quantity of hydrocarbon being encountered. Analysis of the recovered gas can be used to make a determination as to the desirability of recovering the gas or oil from the particular strata. This practice is generally categorized as "mud logging". The known devices for accomplishing mud logging separate the gas from the fluid by an agitation or vibrating process. The gas, i.e. hydrocarbon, samples are collected in a gas trap during this operation. Gas traps of several different designs are currently used in the mud logging industry in order to extract light hydrocarbon gases from the return flow line mud for measurement. The purpose of this measurement is twofold: (1) to provide warning of dangerous underbalanced drilling conditions indicated by increased gas returns; and (2) to evaluate the formation being drilled for hydrocarbon productivity.

Several different gas traps are currently used in the mud logging industry. The purpose of these trap systems is to measure the amount of gas in the drilling fluid, which gas will be representative of the formation gas. This measurement is critical to identification of productive zones during drilling of the well. However, existing traps are not reliable and are very dependent upon operating conditions, such as mud flow rate and air dilution of the sample as it passes through the trap. These parameters cannot be readily controlled by many existing trap designs. The fluid level, where the trap is installed, will change during the drilling operation. This change in level will affect the flow of fluid through the trap thereby changing the amount of gas measured by the trap over any given time period while there is no actual change in the amount of gas in the drilling fluid.

The amount of air dilution cannot be measured accurately in the current traps because of air and gas leaks through the fluid exhaust port, which is generally open to the air outside the trap, and leakage around the motor shaft stirrer bar.

In general, gas traps operate by diverting a portion of the return mud through an enclosed volume which provides some mechanism for gas release within that volume. The mechanism may be passive, such as a mud-spreading plate, or may contain some sort of mechanical agitator to maximize the mud/air contact. In either case, the evolved gas is conveyed to the analytical equipment by means of suction applied to a gas phase sample line attached to the trap body. Due to the need to provide continuously updated gas readings, mud residence time within the trap is normally so short that only a fraction of the gas is released. For quantitative operation, the trap design must therefore be such that the observed gas in the sample stream can be easily related to the actual gas content of the return mud.

Regardless of the details of the trap operation, several flows are always present in one form or another, mud phase entry and exit flows to permit continuous sampling of fresh mud, gas phase sampling flow, and gas phase vent flow whose direction and rate is determined by the difference in gas evolution and gas sampling rates. In order for quantitative reproducible readings to be obtained, these flows should be discreet and accessible to measurement by the operator. Of particular importance is the avoidance of uncontrolled external air and evolved gas mixing due to poor design of the trap vent flow, a failing encountered in several commonly used trap designs.

Another fault in many designs is the excessive variation in trap response with changes in the return mud level. The driller often has occasion to change the pump rate. Such flow rate changes alter the level of mud in the return mud handling equipment and, unless the trap is dynamically mounted, also alter the immersion level of the trap mud entry port. One solution sometimes is to provide an active pumping mechanism in the trap, but, due to formation cuttings in the mud, such pumps are prone to jamming and high maintenance requirements with the attendant high costs.

SUMMARY OF THE INVENTION

The present invention overcomes the difficulties of the prior art by providing a gas trap which eliminates problems with existing trap designs and provides an accurate and reliable tool for measuring mud gas. Quantitative operation is provided by inclusion of a discrete air vent line, whose far end is in gas-free air, and by elimination of uncontrolled gas phase mixing at the mud exit port and the agitator shaft feed-through. The mud exit port is sealed to gas exchange by means of a down-tube directing the exiting mud to below the external mud surface. In addition, the down-tube design is such that spent mud is directed away from the mud entry port to insure that fresh mud is continuously sampled. The invention provides immersion level insensitivity by means of an agitator design used in combination with a mud containment ring within the trap body. Finally, trap operation is made more reliable and maintenance free by means of splash protection baffles which minimize the chance for mud plugging of the vent and sampling lines.

The present invention is a gas trap which is compact, easily installed, has low maintenance requirements, provides quantitative gas recovery and is insensitive to immersion level changes encountered during normal drilling operations. The present invention is of the enclosed agitator type. In general, the present invention is of maximum simplicity and economy of design in that a number of important functions are simultaneously provided by the agitator, including, but not limited to: (1) the trap body is configured such that the agitator pumps mud through the trap by centrifugal action so that no external mud pump is required; (2) the agitator provides vigorous mud/gas phase mixing within the trap body to release the gas entrained in the mud; (3) the agitator motion causes rapid gas phase mixing of evolved gas and vent air so that the sample line gas is representative of the current gas content of the mud; (4) the agitator induced fluid flow acts to clear the trap body of mud cuttings with little operator maintenance needed; (5) the agitator design gives constant gas evolution for a given amount of gas in the mud, even with changes in the immersion level of the trap mud entry port in the mud; and (6) the agitator has means which prevent clogging due to the naturally occurring splashing of the mud within the trap.

BRIEF DESCRIPTION OF THE DRAWINGS

The present invention will now be described, by way of example, with reference to the accompanying drawings in which.

DETAILED DESCRIPTION OF THE PRESENT INVENTION

Figure 1:
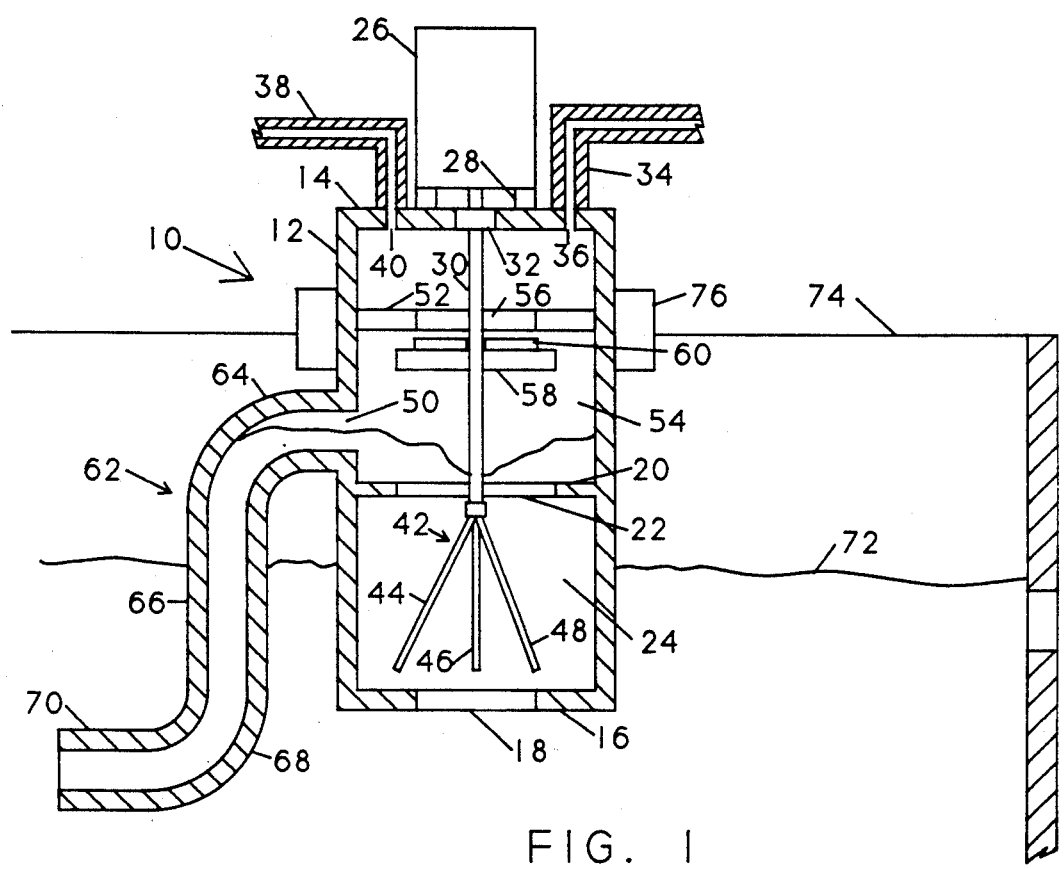
FIG. 1 is a vertical section through the subject gas trap in an operative condition.
Figure 2:
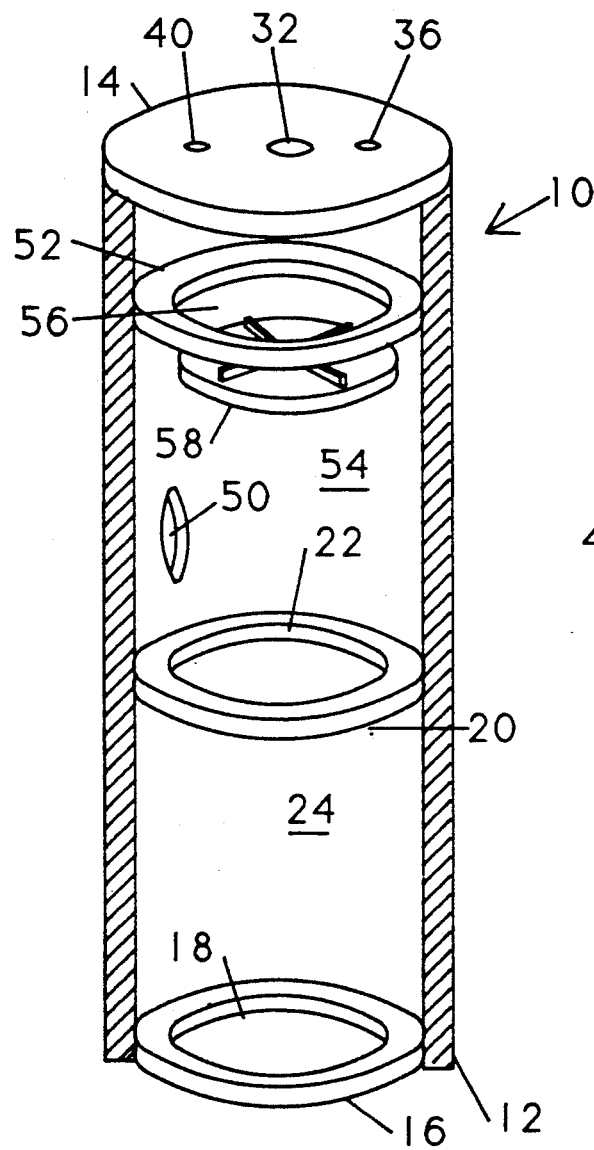
FIG. 2 is a perspective view, partially in section, of the trap body portion of the subject invention.

Turning first to the vertical section of FIG. 1, the subject gas trap 10 has a cylindrical trap body 12 closed at its upper end by plate 14 and at its lower end by a plate 16 having a central annular aperture 18 which is coaxial with the housing 12. Intermediate the ends of the housing 12 is an annular plate 20 having a central annular opening 22 which also is coaxial with the housing 12. Plates 16 and 20 define a mixing chamber 24 therebetween.

A constant speed motor 26 is mounted coaxially on top plate 14 by means of spacers 28. A shaft 30 of the motor extends through gas tight feed-through 32 into the interior of the housing 12. A sample line 34 is connected to port 36 and a vent line 38 is connected to port 40. These ports have been shown in the top plate 14 but need not be so located. An agitator 42 is connected to the bottom of the shaft 30 and lies in the mixing chamber 24 defined between the plates 16 and 20. The embodiment of the agitator 42 shown in FIG. 1 consists of a plurality of legs 44, 46, 48 fixed at their upper ends to shaft 30 and downwardly diverting so that, in revolution, they define a conical configuration. A mud exit port 50 is formed in the housing 12 above the level of the intermediate plate 20. An annular plate 52 is fixed in the housing above the mud exit port 50 to define a splash chamber 54 between plates 20 and 52. The annular plate 52 has a central aperture 56 which is coaxial with housing 12 and through which shaft 30 passes. A splash disc 58 is mounted on the shaft 30 below and immediately adjacent to annular plate 52. The splash disc 58 has a plurality of integral, radially directed gas mixing vanes 60 directed towards plate 52. A mud exhaust line 62 is connected to the mud exit port 50 and is here shown with a first downwardly bent elbow 64, a straight intermediate portion 66, a second bent elbow 68 and a short straight extension 70.

The purpose of the mud exhaust line is two fold. First, by returning the mud to below the surface of the mud 72 in tank 74, it insures that there will be no uncontrolled dilution of the evolved gas within the housing 12 from outside air. Second, it insures that the spent mud exiting the trap 10 will be returned below the level of the mud at a point remote from and directed away from the entry of the mud to the subject gas trap through aperture 18 thereby assuring that the trap 10 will be constantly working on a fresh mud supply.

The lower and intermediate plates 16, 20 limit mud flow and also provide a more discreet air/mud mixing volume.

The trap 10 is mounted in a conventional mud tank 74 by known means 76 such that the external mud level 72 is about midway between the lower and intermediate plates 16, 20 when the rig pumps (not shown) are at their normal operating rate. This mounting of the subject trap 10 can be achieved by any of a number of known fixed and adjustable mounting means which have been schematically shown.

The length of the straight portion 66 of the mud exhaust line 62 is such that the diversion elbow 68 is located below the mud level, and preferably below the lower plate 16 as shown. The elbow 68 is spaced from and directed away from the intake aperture 18 of the trap. The trap orientation in the tank is such that the mud exit port 50 is downstream of the mud flowing past the trap. The mud enters the trap 10 via the opening 18 in the lower plate 16 at the trap bottom and is vigorously mixed by the agitator 42 in the mixing chamber 24 in order to release entrained gas. The centrifugal agitation motion causes the mud to exit the mixing chamber 24 through the opening 22 in the intermediate plate 20 and to be returned to the mud tank via mud exit port 50 and exhaust line 62. The action of the agitator 42 also causes rapid gas phase mixing of air admitted via the vent port 36 with gases released from the mud.

The purpose of the mud exit line assembly 62 and the sealed feed through 32 is to provide quantitative operation by eliminating mixing of the evolved gas with external air. Such mixing would act to dilute the evolved gas in an unpredictable fashion, particularly when the trap is subject to variable wind conditions. The diversion elbow 68 on the mud exit line assembly 62 assures that the spent mud, that is the mud having at least a portion of the entrained gas removed therefrom, is not recirculated through the trap body which, of course, would cause an erroneous reading by diluting the incoming drilling mud with processed mud from which the gas had been removed.

The air vent 40 is present for gas phase pressure equilibration and allows the suction rate of the sample line to be set at any desired level regardless of the actual gas evolution rate from the trap. The exact location of the vent port 40 in the trap body is not critical. The primary consideration for the location of the suction and vent ports is that there be good mixing of the air with the evolved gas and avoidance of plugging of the ports due to mud splashing. This latter feature is accomplished in the upper part of the trap gas sample mixing chamber 54 by fixed annular ring 52 in combination with splash disc 58 and vanes 60 mounted on the agitator shaft 30. The vent line diameter and its length are such that the end of the line away from the trap is in essentially gas free air and the line pressure drop is small at the suction flow rates of interest.

When the suction rate exceeds the total gas evolution rate, mass balance consideration show that for each gas component of interest the percentage gas by volume in the sample line is related to the evolution rate of that component by the equation $$\% \ C = 100 \times R/S$$

where
R = component evolution rate from mud phase in volume per unit time (such as cfh):
S = suction rate measured in the same units; and
% C = the percentage by volume of component in suction gas.

The operator will normally use a suction rate in excess of the largest total evolution rate whose precise measurement is of interest. When the total gas evolution rate exceeds the suction rate, the trap is saturated in that gas is lost via the vent and the above equation no longer applies. In practice a minor portion of the evolved gas may be lost via the mud exit port due to agitator created bubbles. This loss effectively increases the suction rate and may be accounted for by adding a correction term to the value for S in the equation.

Figure 3:
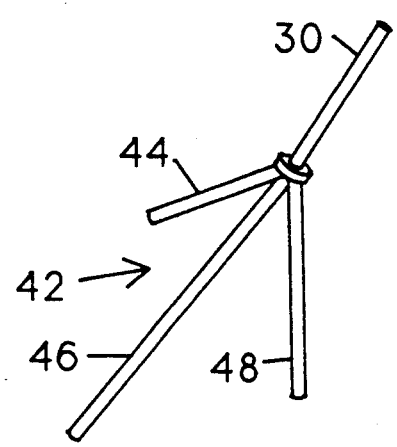
FIG. 3 is a perspective view of the preferred embodiment of the agitator.

The three pronged agitator detailed in FIGS. 1 and 3 and the intermediate plate 20 act to stabilize the gas evolution rate against changes in trap immersion level in the mud. In general the overall trap mud flow tends to increase with the immersion level. The agitator is designed to gradually lose its mud/air mixing effectiveness as it is more deeply submerged in the mud. As a result, the net evolution rate which is given by product of mud flow rate and the efficiency of mud gas removal tends to remain constant.

The present invention may be subject to many modifications and changes without departing from the spirit or essential characteristics of the invention.

What is claimed is:

1. In a mud logging system, an improved gas trap comprising:
    a cylindrical housing having a restricted opening bottom end, a closed top end, and a first restricted opening intermediate member;
    means to mount said housing in a mud receptacle with said housing in a substantially vertical condition and with the bottom of said housing extending below the surface of said mud;
    motor means mounted on said top cover and connected to drive a shaft coaxially of said housing;
    feed through means forming a seal between said shaft and said top cover;
    agitator means attached to said shaft means and lying substantially between said bottom end and said intermediate member;
    a mud exit port between said first intermediate member and said top cover;
    mud exhaust line connected to said exit port and extending below the mud surface and both spaced from and directed away from said bottom end;
    vent line means to admit substantially gas free air to said housing; and
    means to draw off from said chamber gas evolved from said mud.

2. The apparatus according to claim 1 wherein said feed through means, mud exhaust line and vent line means, in combination, prevent uncontrolled mixing of external air and evolved gas while allowing independent setting of a sample line suction flow rate.

3. An apparatus according to claim 1 wherein said agitator comprises a plurality of members fixed to said shaft at their upper ends and diverging to form a conical configuration when rotated, said agitator providing a more constant gas evolution versus trap immersion level characteristic.

4. An apparatus according to claim 1 wherein said intermediate member is fixed in said housinq below the mud exit port and together with said bottom end defines a mixing chamber which limits mud flow and enhances gas evolution at low trap immersion levels.

5. An apparatus according to claim 1 wherein the mud outlet is angled with respect to the axis of said housing to minimize mud splashing and therefor reduce resistance.

6. An apparatus according to claim 1 wherein said open bottom end helps control mud flow rate through the trap and immersion level sensitivity.

7. An apparatus according to claim 1 further comprising:
    a splash disc having integral radial vanes and being mounted on said shaft; and
    a second annular intermediate member mounted in said housing spaced below said top end and immediately above said splash disc to minimize mud splashing in said chamber and improve gas mixing.

* * * * *